UNITED STATES PATENT OFFICE.

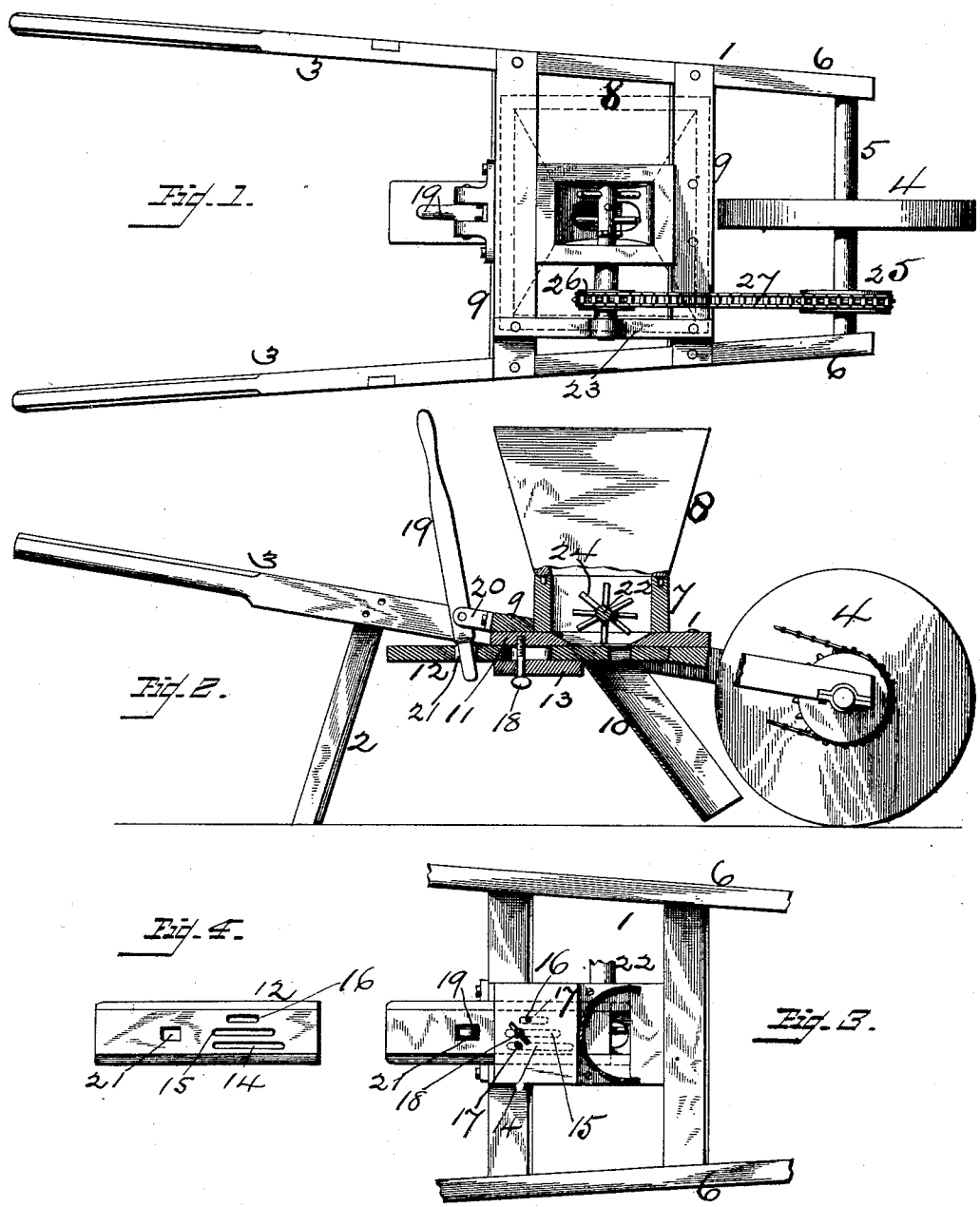

ROBERT A. PENNAL, OF BIGBY FORK, MISSISSIPPI.

FERTILIZER-DISTRIBUTER.

SPECIFICATION forming part of Letters Patent No. 348,862, dated September 7, 1886.

Application filed June 1, 1886. Serial No. 203,831. (No model.)

*To all whom it may concern:*

Be it known that I, ROBERT A. PENNAL, a citizen of the United States, residing at Bigby Fork, in the county of Itawamba and State of Mississippi, have invented certain new and useful Improvements in Fertilizer-Distributers; and I do hereby declare the following to be a full, clear, and exact description of the invention, such as will enable others skilled in the art to which it appertains to make and use the same.

This invention relates to improvements in walking fertilizer-distributers.

The distributer constructed according to my improvements consists of a framing upon which is supported a receiving and distributing box, a supply-hopper above and connecting with said box, a propelling-wheel at the front of the frame, handles, and supporting-legs of ordinary construction. Journaled within a cross-bar of the frame is one end of the stirrer-shaft, which enters the distributing-box, and has stirrers thereon, a pulley or wheel being mounted, respectively, upon the wheel-axle, and also upon the stirrer-shaft, and connected by a chain or belt in order to transmit rotary motion from the axle to the stirrer-shaft. The bottom of the box is provided with a slide having slots of unequal lengths therein to permit of the ready adjustment of said slide, to increase or decrease the size of the discharge-opening at the bottom of the box. The rear end of this slide projects outward, and has connected thereto an operating-lever, a delivery-spout being connected to the bottom of the box and extending downward a sufficient distance to reach or nearly reach the bottom of the furrow, all as hereinafter described.

In the accompanying drawings, Figure 1 represents a top plan view, and Fig. 2 a side elevation, of a walking-distributer constructed according to my improvements. Fig. 3 represents an under side plan view of a portion thereof. Fig. 4 represents a plan view of the slide.

1 represents the framing of the distributer; 2, the supporting-legs; 3, the handles; 4, the propelling-wheel; 5, the axle thereof, journaled between the front ends of the side beams, 6 6. The wheel being keyed or otherwise rigidly connected to said axle, they will revolve together.

7 represents the box for containing the fertilizer to be distributed, and 8 the supply-hopper mounted thereon. The box 7 is mounted between and attached to the cross-pieces 9, so as to extend below the same, and has connected to its lower portion a delivery-spout, 10, which extends downward a sufficient distance to allow of its entering the furrow and reaching nearly to the bottom thereof, in order that the fertilizer shall be delivered to and laid directly upon the bottom of the furrow, and thus prevent the scattering of any portion of the fertilizer by the wind or by reason of any jolting of the machine. The spout may be of cylindrical form, if desired; but I prefer to construct it of curved or semi-tubular form in cross-section, in order that any fertilizer adhering thereto may readily be scraped therefrom, and in such construction the spout is placed in position with the concave surface thereof to the front.

11 represents a slotted rearward extension of the box 7, which is attached to the under side of the rearmost cross-piece 9, and forms a guideway in which the slide 12 may reciprocate.

13 represents a plate or strip attached to the under side of and covering the slotted extension-piece 11.

The slide 12 is provided with three slots, 14 15 16, of unequal length, and the covering-strip 13 has three holes, 17, therein, vertically in line therewith, and serves to limit the reciprocation of said slide. By forming the slide with slots of unequal length I am enabled, by placing the screw 18 through the appropriate hole 17 into engagement with either the longest slot, 14, to insure the slide being drawn out to its fullest extent, and thus have the opening in the bottom of the box entirely free for the passage of the fertilizer to spout, while by transferring said screw to engage with the central slot, 15, which is slightly shorter than the slot 14, the rearward movement of the slide is limited, and consequently a portion of the front end of said slide extends partly across the opening in the bottom of the fertilizer-box, leaving, say, only one-half of the bottom opening therein free. When it is desired to still further decrease the bottom opening to leave, say, only one-fourth of the opening free for the passage of the fertilizer, I place the screw 18 in engagement with the slot 16, which, being shorter than either of the other slots 14 15 in the slide, prevents the slide being drawn back by the operating-lever as far as when the screw is in engagement with either of the other slots. By this construction I am enabled to readily and effectively adjust the slide so as to secure the regular feeding of a predetermined amount of fertilizing material for any desired length of time, and also to readily adjust the slide so as to cause the supply of more or less fertilizer whenever desired.

19 represents the slide-operating lever, which is pivoted within a block, 20, attached to the rear edge of the rear cross-bar, 9, the lower end of said lever 19 passing through a vertical slot, 21, forward of the rear end of the slide. By reciprocating said lever the slide is correspondingly reciprocated to either close or open the opening in the bottom of the box 7; but in practice I so construct the slide that, when open, its rear end shall extend some distance rearwardly of the rear cross-piece 9, in order that the person using the device may, whenever it is desired to discontinue the supply of fertilizing material, readily close the slide by simply pushing against the rear end thereof with his foot.

22 represents the fertilizer-stirrer shaft, which is journaled at one end in a cross-piece, 23, attached to the cross-pieces 9, and from thence passes to and through the box wherein its other end is journaled, and has a series of stirrer-arms, 24.

25 26 represent pulleys or wheels keyed or otherwise mounted, respectively, upon the axle 5 and the stirrer-shaft 22, and 27 represent an endless belt or chain connecting said pulleys or wheels 25 26, in order that as said axle revolves a corresponding rotary motion shall be imparted to the stirrer-shaft and the stirrer-arms thereon, and the fertilizing material be thereby stirred.

It is designed to construct the entire machine out of wood, with the exception of the necessary nails or screws to secure the several parts together, and the slide-securing screw, and the belt or chain connecting the pulleys or wheels, a machine so constructed by me out of seasoned white oak having been extensively and satisfactorily used by myself.

Having thus described my invention, what I claim is—

1. A fertilizer-distributer having a supply-regulating slide provided with slots of unequal length and devices for interchangeably engaging said slots and for reciprocating the slide.

2. A fertilizer-distributer having a supply-box having a slotted rearward extension, a feed-regulating slide having longitudinal slots therein of unequal length, and a covering-strip attached to said rearward extension of the supply-box to form therewith a guide for the slide, and having holes therein registering with the slots in the slide, and a screw or analogous device for interchangeably engaging said slots, as and for the purpose set forth.

3. A fertilizer-distributer having a supply-box and a discharge-spout connecting with the bottom thereof, a feed-slide having a rearwardly-extending portion and longitudinal slots of unequal length therein, a plate covering the under face of said slide, and having holes therein registering with the slots in the slide, and means for interchangeably connecting the respective holes and slots, as and for the purpose set forth.

4. A fertilizer-distributer having a suitable frame, a wheel-axle journaled between the front ends of the side beams, a traction-wheel keyed thereon, a feed-box, a stirrer-shaft journaled within said frame and feed-box, respectively, and having suitable stirrer-arms, pulleys or wheels mounted upon the wheel axle and the stirrer-shaft, a belt or chain connecting said pulleys or wheels, a delivery-spout extending downward a sufficient distance to enter nearly to the bottom of the furrow, a feed-slide having slots of unequal length formed therein, means for interchangeably engaging with said slots for the purpose of regulating the extent of reciprocation of said slide, and means for actuating said slide, all substantially as set forth.

In testimony whereof I affix my signature in presence of two witnesses.

ROBERT A. PENNAL.

Witnesses:
I. G. RILEY,
J. O. JOHNSON.